United States Patent
Tominaga et al.

(10) Patent No.: US 10,372,101 B2
(45) Date of Patent: Aug. 6, 2019

(54) STATION AUXILIARY POWER SOURCE APPARATUS

(71) Applicant: Mitsubishi Electric Corporation, Chiyoda-ku, Tokyo (JP)

(72) Inventors: Mitsushi Tominaga, Tokyo (JP); Shinichi Matsumoto, Hyogo (JP); Shuji Ishikura, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 277 days.

(21) Appl. No.: 14/909,895

(22) PCT Filed: Aug. 8, 2013

(86) PCT No.: PCT/JP2013/071505
§ 371 (c)(1),
(2) Date: Feb. 3, 2016

(87) PCT Pub. No.: WO2015/019466
PCT Pub. Date: Feb. 12, 2015

(65) Prior Publication Data
US 2016/0161935 A1    Jun. 9, 2016

(51) Int. Cl.
*G05B 19/02* (2006.01)
*G05B 19/10* (2006.01)
(Continued)

(52) U.S. Cl.
CPC .......... *G05B 19/106* (2013.01); *B60L 1/003* (2013.01); *B60L 7/14* (2013.01); *B60L 9/18* (2013.01);
(Continued)

(58) Field of Classification Search
CPC .......... G05B 19/106; B60L 1/003; B60L 7/14; B60L 9/18
See application file for complete search history.

(56) References Cited

U.S. PATENT DOCUMENTS

| | | | |
|---|---|---|---|
| 5,943,246 A | * | 8/1999 | Porter .................... H02H 3/207 307/43 |
| 2013/0147441 A1 | | 6/2013 | Lee et al. |
| 2016/0118795 A1 | * | 4/2016 | Berkowitz ............ H02J 3/1807 700/286 |

FOREIGN PATENT DOCUMENTS

| | | |
|---|---|---|
| JP | 63-291740 A | 11/1988 |
| JP | 02-077340 A | 3/1990 |

(Continued)

OTHER PUBLICATIONS

International Search Report (PCT/ISA/210) dated Nov. 12, 2013, by the Japanese Patent Office as the International Searching Authority for International Application No. PCT/JP2013/071505.

(Continued)

*Primary Examiner* — Bradley Smith
(74) *Attorney, Agent, or Firm* — Buchanan Ingersoll & Rooney PC

(57) ABSTRACT

The present invention relates to a station auxiliary power source apparatus that converts power supplied from an overhead cable to generate power to be supplied to a load in a station. The station auxiliary power source apparatus includes a first average calculation unit that calculates the average value of the overhead cable voltage for every predetermined time period; a second average calculation unit that calculates, two or more times, an average value of the overhead cable voltage that is larger than a first average value of the average value among the overhead cable voltages; a third average calculation unit that calculates an average value of the overhead cable voltage per day; and a (Continued)

comparator that selects any one of a second average value of the average value and a third average value of the average value and sets the selected value as the threshold value.

9 Claims, 4 Drawing Sheets

(51) Int. Cl.
*B60L 9/18* (2006.01)
*B60M 3/06* (2006.01)
*B60L 1/00* (2006.01)
*B60L 7/14* (2006.01)
*B60L 50/51* (2019.01)
*B60L 55/00* (2019.01)
*B60L 53/63* (2019.01)

(52) U.S. Cl.
CPC ............... *B60L 50/51* (2019.02); *B60L 53/63* (2019.02); *B60L 55/00* (2019.02); *B60M 3/06* (2013.01); *B60L 2200/26* (2013.01); *B60L 2240/34* (2013.01); *B60L 2240/527* (2013.01); *B60L 2240/529* (2013.01); *B60L 2250/16* (2013.01); *G05B 2219/2639* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y04S 10/126* (2013.01)

(56) References Cited

FOREIGN PATENT DOCUMENTS

| JP | 2006-062427 A | 3/2006 |
| JP | 2006-168390 A | 6/2006 |
| JP | 2008-032229 A | 2/2008 |
| JP | 2013-001338 A | 1/2013 |
| JP | 2013-123359 A | 6/2013 |

OTHER PUBLICATIONS

Written Opinion (PCT/ISA/237) dated Nov. 12, 2013, by the Japanese Patent Office as the International Searching Authority for International Application No. PCT/JP2013/071505.

Office Action dated Jun. 13, 2017, by the German Patent Office in corresponding German Patent Application No. 11 2013 007 306.4, and an English Translation of the Office Action. (12 pages).

Office Action dated Jul. 4, 2016, by the Australian Patent Office in corresponding Australian Patent Application No. 2013397332. (2 pages).

Smat, Radim, "Introduction to comparators, their parameters and basic applications", AN4071 Application note, Doc ID 022939 Rev 1, Oct. 2012, STMicroelectronics. (27 pages).

Office Action dated Nov. 16, 2018, by the Indian Patent Office in corresponding Indian Patent Application No. 201647003768, including English translation. (5 pages).

* cited by examiner

STATION AUXILIARY POWER SOURCE APPARATUS

FIELD

The present invention relates to a station auxiliary power source apparatus that supplies power to various types of loads in a station.

BACKGROUND

In recent years, electric vehicles equipped with regenerative brakes have come into use in railway systems. However, in a case where there are few or no other electric vehicles serving as loads to consume the regenerative electric power returned from the electric vehicle through an overhead cable (a feeder cable), the regeneration effect is lost and the regenerative brake may become unusable. To address such a problem, a system has been proposed in which a power storage apparatus is provided for the regenerative electric power to be stored when there is no electric vehicle consuming the regenerative electric power (Patent Literature 1). In the system described in the proposal, when an overhead cable voltage (a feeder voltage) is equal to or more than a charging start voltage, an operation starts that converts the regenerative electric power in order to charge a power storage apparatus, and when the overhead cable voltage is equal to or less than a discharging start voltage, an operation starts that converts the power charge in the power storage apparatus and discharges it through the overhead cable. However, when the charging start voltage is fixed, the overhead cable voltage may be increased while no load is being applied in the early morning or at night and it may reach the charging start voltage. This causes a cross current to occur even though regeneration is not occurring. The cross current is a current that occurs when the power supplied from an electric power substation is consumed (i.e. the power storage apparatus is charged) instead of the regenerative electric power of the electric vehicle being consumed. In the system of Patent Literature 1, the overhead cable voltage is monitored for a certain time period to calculate an average voltage, and a voltage value that is higher than the average voltage for a certain number of voltages is set as the charging start voltage. Thus, a cross current can be prevented from occurring.

In the system of Patent Literature 1, the surplus amount of regenerative electric power (the regenerative electric power not fully consumed by the other electric vehicles while they are running) is accumulated in the power storage apparatus. However, a configuration can be envisioned in which the surplus regenerative electric power is consumed, for example, by various types of loads (illumination devices, air conditioners, elevators, and the like) in the station. In this configuration where the regenerative electric power is consumed by loads in the station, the power storage apparatus becomes unnecessary, and the regenerative electric power is then effectively used at a lower cost.

CITATION LIST

Patent Literature

Patent Literature 1: Japanese Patent Application Laid-Open No. 2006-168390

SUMMARY

Technical Problem

In the invention disclosed in Patent Literature 1, a voltage value higher than the average value of the overhead cable voltage is set as the charging start voltage (a voltage for starting the consumption of the regenerative electric power). However, in the technique disclosed in Patent Literature 1, when the voltage at which consumption of the regenerative electric power starts is set, the regenerative electric power is the regenerative electric power that is interchanged among the electric vehicles during a rush hour or the like, and even when the overhead cable voltage is lowered, the interchanged regenerative electric power is accumulated in the power storage apparatus or is consumed by loads in the station. When the regenerative electric power is interchanged among the electric vehicles, it is desirable that the regenerative electric power not be accumulated in the power storage apparatus nor be consumed by the loads in the station.

The present invention has been made in view of the above, and an objective thereof is to obtain a station auxiliary power source apparatus that accurately determines a state where the regenerative electric power is not fully interchanged among the electric vehicles and that can accurately time the start of an operation in which the regenerative electric power is consumed by the loads in the station.

Solution to Problem

In order to solve the problem and achieve the objective mentioned above, the present invention relates to a station auxiliary power source apparatus that converts power supplied from an overhead cable to generate power to be supplied to a load in a station in a case where an overhead cable voltage is higher than a predetermined threshold value. The station auxiliary power source apparatus includes: a first average calculation unit that calculates an average value of the overhead cable voltage every predetermined time period; a second average calculation unit that calculates an average value from the overhead cable voltages that are larger than a first average value, which is the average value, among the overhead cable voltages detected a plurality of times in a predetermined time period; a third average calculation unit that calculates an average value of the overhead cable voltage per day; and a selection unit that selects any one of a second average value, which is the average value calculated by the second average calculation unit, and a third average value, which is the average value calculated by the third average calculation unit, and sets the selected value as the threshold value.

Advantageous Effects of Invention

According to the invention, regenerative electric power can be efficiently used.

DESCRIPTION OF EMBODIMENTS

Hereinafter, an embodiment of a station auxiliary power source apparatus according to the present invention is described in detail with reference to the drawings. Note that the invention is not limited by the embodiment.

Embodiment

Figure 1:
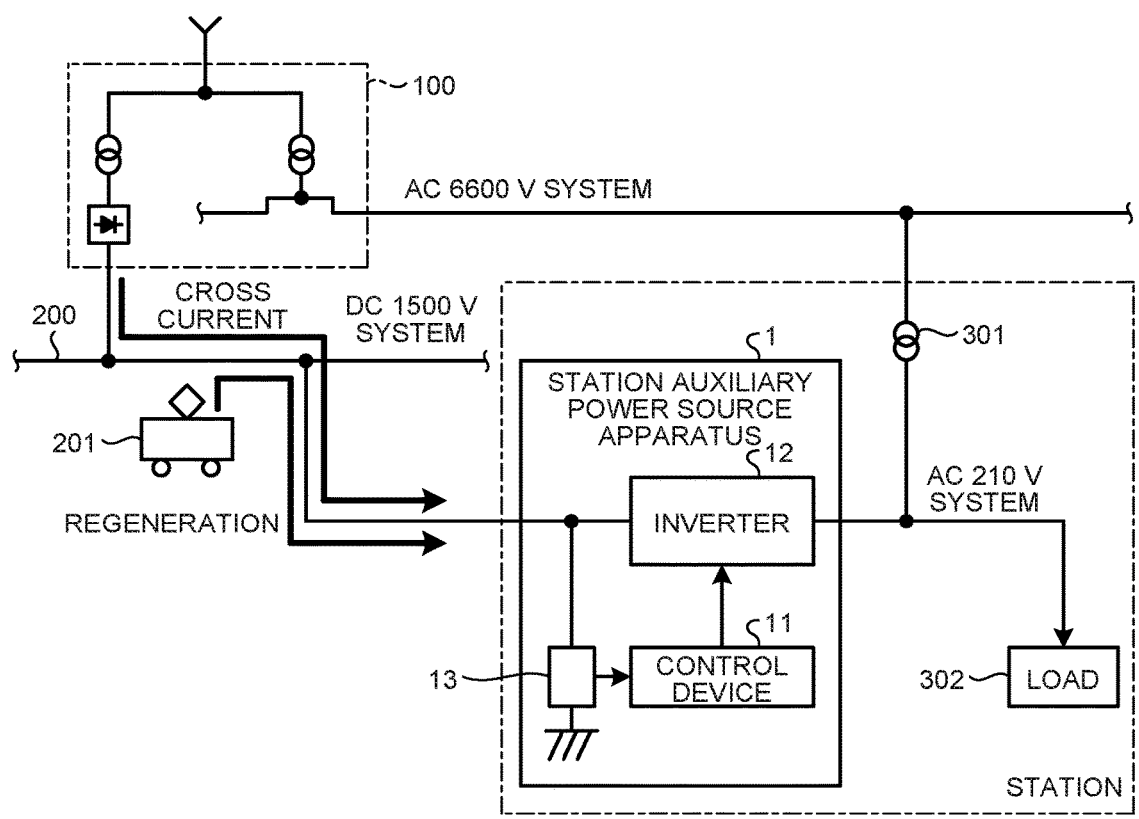
FIG. 1 is a diagram illustrating an exemplary configuration of a railway system which is equipped with a station auxiliary power source apparatus according to the present invention.

FIG. 1 is a diagram illustrating an exemplary configuration of a railway system which is equipped with a station auxiliary power source apparatus according to the present invention. As illustrated in FIG. 1, a station auxiliary power source apparatus 1 provided at a station includes a control device 11, an inverter 12, and a voltage sensor 13. The station auxiliary power source apparatus 1 is configured to convert power (for example, DC 1500 V) supplied from an overhead cable 200 to supply power used by a load 302 in the station. The converting operation is, however, not always performed. It is determined whether regenerative electric power generated by the electric vehicles in the railway system can be consumed by other electric vehicles (that is, whether the power consumed by an electric vehicle (e.g., an electric vehicle that is running) is larger than the electric power generated by an electric vehicle that is being decelerated by using a regenerative brake). In a case where the regenerated power is not fully consumed, the converting operation is performed. A transformer 301 converts the power (for example, AC 6600 V) generated by an electric power substation 100 and this converted power (for example, AC 210 V) is also supplied to the load 302, and it is this power supplied from the transformer 301 that is usually used by the load. The load 302 is, for example, an illumination device, an air conditioner, a display device, an elevator, an escalator, and the like. The overhead cable 200 is connected to the electric power substation 100, and power is supplied at DC 1500 V, for example, to an electric vehicle 201 therethrough.

In the station auxiliary power source apparatus 1, the control device 11 receives the regenerative electric power generated by an electric vehicle that is in operation (the electric vehicle 201 and other electric vehicles (not illustrated in the drawing)) through the overhead cable 200, and it determines, on the basis of the overhead cable voltage, whether it is necessary to convert power to supply the load 302. When it is determined that the conversion is necessary, the control device 11 controls the inverter 12 such that it performs the power converting operation. The inverter 12 includes switching elements and turns on or off each of the switching elements according to a command from the control device 11. Thus, the power supplied from the overhead cable 200 is converted into power to be supplied to the load 302. The voltage sensor 13 detects the overhead cable voltage.

Figure 2:
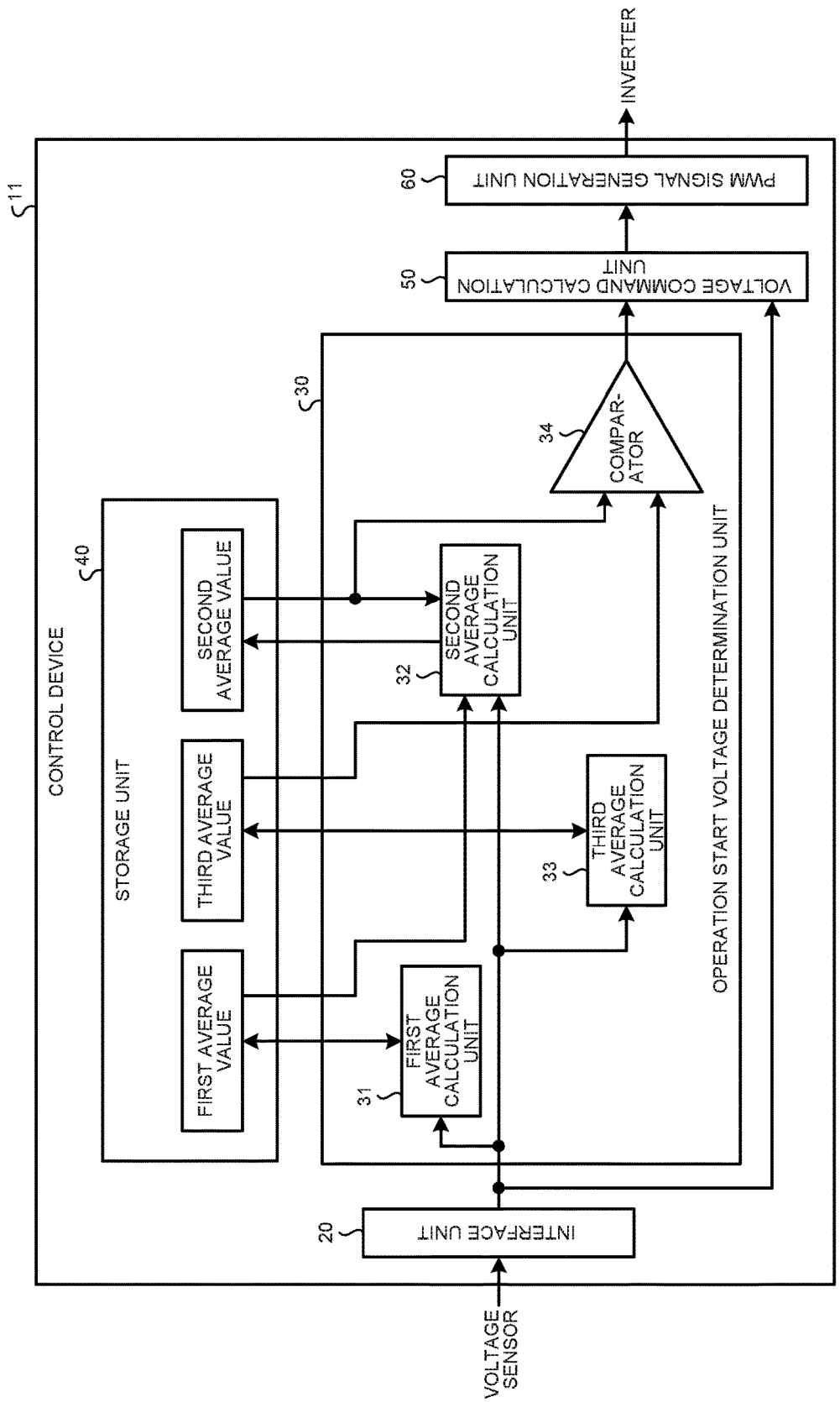
FIG. 2 is a diagram illustrating an exemplary configuration of a control device.

FIG. 2 is a diagram illustrating an exemplary configuration of the control device 11. The control device 11 includes an interface unit 20, an operation-start voltage determination unit 30, a storage unit 40, a voltage command calculation unit 50, and a PWM signal generation unit 60.

The interface unit 20 performs an averaging operation on the overhead cable voltages output by using the voltage sensor 13 (hereinafter, simply referred to as an "overhead cable voltage") so as to remove noise components. The operation-start voltage determination unit 30 includes a first average calculation unit 31 that calculates averages of the overhead cable voltage (that is the overhead cable voltage after removing the noise components) measured by the voltage sensor 13 for each predetermined time period (for example, for every hour) according to weekday/holiday schedules; a second average calculation unit 32 that extracts voltages higher than the average value (a first average value) of the overhead cable voltage calculated by the first average calculation unit 31 and calculates an average value (a second average value) of the extracted voltages; a third average calculation unit 33 that averages the overhead cable voltages that are measured by the voltage sensor 13 and from which the noise components are removed for each day according to the weekday/holiday schedules; and a comparator 34 functioning as a selection unit that compares the second average value and an average value (a third average value) calculated by the third average calculation unit 33 and then selects and outputs the higher average value selected. The operation-start voltage determination unit 30 determines a voltage at which the power converting operation starts (hereinafter, referred to as a "converting-operation start voltage"). The storage unit 40 stores the first average value, the second average value, and the third average value calculated by the operation-start voltage determination unit 30. The voltage command calculation unit 50 calculates a voltage command value on the basis of the converting-operation start voltage output from the comparator 34 of the operation-start voltage determination unit 30 and the overhead cable voltage output from the interface unit 20. Specifically, when the overhead cable voltage is larger than the converting-operation start voltage, the voltage command value is calculated. The PWM signal generation unit 60 generates a PWM (pulse width modulation) signal to control the inverter 12 on the basis of the voltage command value input from the voltage command calculation unit 50. Further, instead of the third average value calculated by the third average calculation unit 33, a fixed value such as a transferred voltage (a voltage output from the electric power substation 100 to the overhead cable 200) from a rectifier in the electric power substation 100 may be used.

Figure 3:
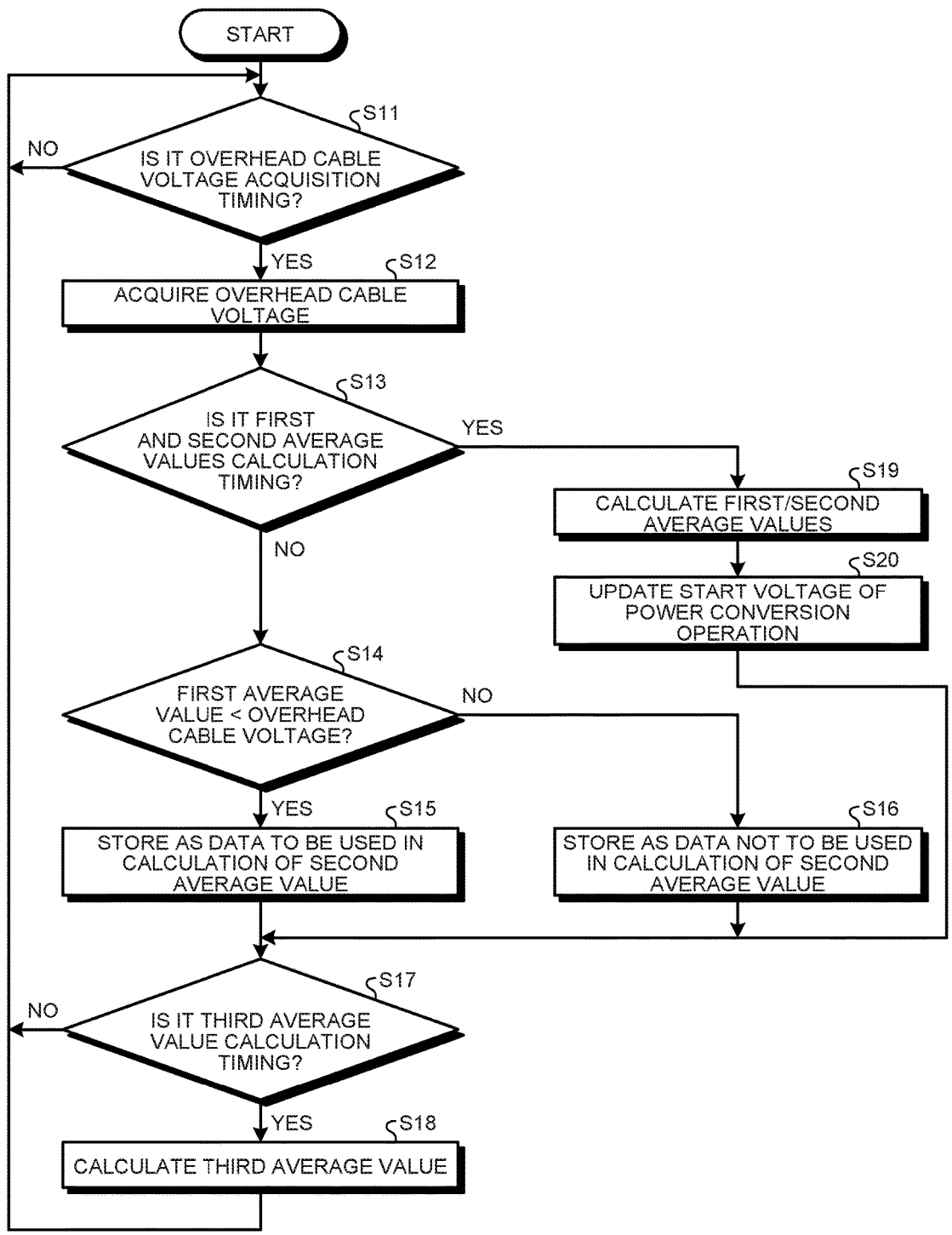
FIG. 3 is a flowchart illustrating an exemplary operation of an operation-start voltage determination unit.

FIG. 3 is a flowchart illustrating an exemplary operation of the operation-start voltage determination unit 30. The operation-start voltage determination unit 30 acquires the overhead cable voltage from the voltage sensor 13 at a predetermined timing (for example, every minute) (Steps S11 and S12). The operation-start voltage determination unit 30 having acquired the overhead cable voltage determines whether it is an appropriate time for calculating the first average value and the second average value (Step S13). For example, in a case where the first average value and the second average value are set to be calculated every hour, an elapsed time from the previous calculation of the first average value is confirmed at Step S13. When it is determined that one hour has elapsed, it is determined as the time to perform a calculation. The calculation timing may be determined to be at 00 minutes of every hour.

When it is determined that is it not the time to perform a calculation (Step S13: No), the overhead cable voltage is compared with the first average value stored in the storage unit 40 (Step S14). The first average value to be compared with the overhead cable voltage is set to be a first average value for a given time and date. For example, when Step S14 is performed at 6:10 am on a weekday in a state where the first average value and the second average value are set to be calculated at 00 minutes of every hour, the first average value in the 6 am time zone on a weekday is compared with the overhead cable voltage. When the overhead cable voltage is determined to be larger than the first average value (Step S14: Yes), the overhead cable voltage is stored as data to be used when the second average value is calculated (Step S15). When the overhead cable voltage is equal to or less than the first average value (Step S14: No), the overhead cable voltage is stored as data not to be used when the second average value is to be calculated (Step S16). The overhead cable voltage is, for example, written and stored in a predetermined area of the storage unit 40.

After the overhead cable voltage value is stored at Step S15 or S16, it is determined whether it is the time for calculating the third average value (Step S17). Since the third average value is an averaged value of the overhead cable voltage per day, it is determined whether the current time is, for example, midnight (12 am). When the current time is 12 am, it is determined that it is time to calculate the third average value. In a case where it is time to calculate the third average value (Step S17: Yes), an average value of the overhead cable voltage for the last 24 hours is calculated. When the calculated average value corresponds to an average value of the measured overhead cable voltage on a weekday (i.e., a day when a train runs according to a weekday schedule), it is stored as the third average value on the weekday, and when the calculated average value corresponds to an average value of the measured overhead cable voltage on a holiday (i.e., a day when a train runs according to a holiday schedule), it is stored as the third average value on the holiday (Step S18). Further, the previously stored third average value is deleted. In other words, in a case where the third average value on the weekday is calculated, the stored third average value on the weekday is deleted (rewritten), and in a case where the third average value on the holiday is calculated, the stored third average value on the holiday is deleted (rewritten). In contrast, in a case where it is not time to calculate the third average value (Step S17: No), the procedure returns to Step S11 to continue the operation. Even in a case where Step S18 is performed, the procedure still returns to Step S11 to continue the operation.

Meanwhile, in a case where it is determined that it is time to calculate the first average value and the second average value at Step S13 (Step S13: Yes), the first average value and the second average value are calculated and stored (Step S19). For example, in a case where the first average value and the second average value are set to be calculated once every hour, the first average value is acquired by averaging the latest overhead cable voltage and the overhead cable voltages within latest period of one hour, i.e., the overhead cable voltage acquired at Step S12 and the overhead cable voltages stored at Steps S15 and S16 performed within the latest period of one hour. The acquired average value is then set as the first average value. Further, in a calculation process of the second average value, the latest overhead cable voltage and the first average value are compared, and in a case where the latest overhead cable voltage is larger than the first average value, the average value is calculated by using the latest overhead cable voltages and each of the overhead cable voltages that are stored to be used when acquiring the second average (i.e., the overhead cable voltages stored at Step S15 performed within latest period of one hour). The acquired average value is then set as the second average value. Further, in a case where the latest overhead cable voltage is equal to or less than the first average value, the average value is calculated by using each of the overhead cable voltages stored as the data to be used for the calculation of the second average value among the overhead cable voltages within latest period of one hour. The acquired average value is then set as the second average value. When the average value of the overhead cable voltage is set on a measurement taken on a weekday, the calculated first and second average values are stored in the storage unit 40 as the first and second average values on the weekday, and when the average value of the overhead cable voltage is set on the measurement taken on a holiday, the calculated first and second average values are stored in the storage unit 40 as the first and second average values on the holiday. Further, the first and second average values previously stored are deleted. For example, in a case where the first average value and the second average value are calculated from 7 am to 8 pm on the weekday, the first average value and the second average value from 7 am to 8 pm on the weekday previously stored are deleted (rewritten).

After the first and second average values are calculated, the converting-operation start voltage is determined (updated) (Step S20). Specifically, the third average value is compared with the second average value corresponding to the current time among the stored second average values, and the voltage of the larger one is determined to be the converting-operation start voltage. For example, after the first and second average values are calculated at 8 pm on a holiday in a state where the first average value and the second average value are set to be calculated every 30 minutes, the second average value from 8 pm to 8:30 pm on the holiday (the second average value calculated and stored in the past) and the third average value on the holiday are compared. Then, when the second average value is larger, the voltage indicating the second average value is determined to be the converting-operation start voltage, and when the third average value is larger, the voltage indicating the third average value is determined to be the converting-operation start voltage.

Figure 4:
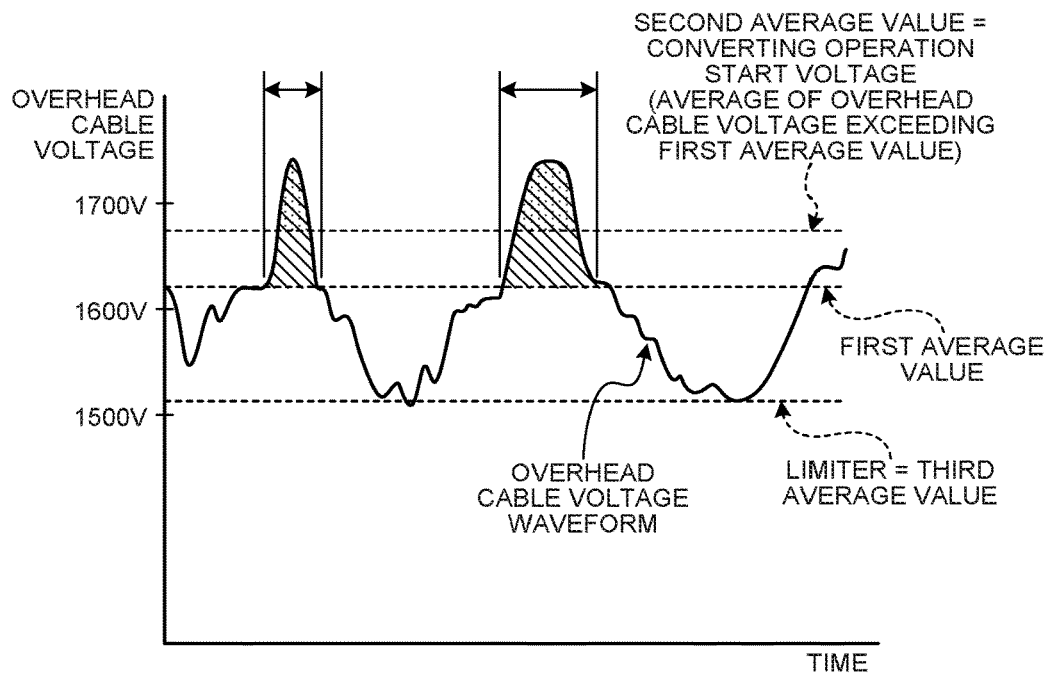
FIG. 4 is a diagram illustrating an example of a relation between an overhead cable voltage, a first average value, a second average value, and a third average value.

FIG. 4 is a diagram illustrating an example of the relation between the overhead cable voltage, the first average value, the second average value, and the third average value when the station auxiliary power source apparatus 1 absorbs the regenerative electric power from an electric vehicle. In the example of FIG. 4, the number of electric vehicles that consume the regenerative electric power is decreased, and thus the overhead cable power is increased as a whole. As illustrated in FIG. 4, in a case where the number of electric vehicles consuming the regenerative electric power generated by the electric vehicle using the regenerative brake is decreased, the station auxiliary power source apparatus 1 uses the second average value as the converting-operation start voltage, and performs the power converting operation when the overhead cable voltage is larger than this voltage, thus generating the power to be supplied to the load 302 (the regenerative electric power is consumed).

Figure 5:
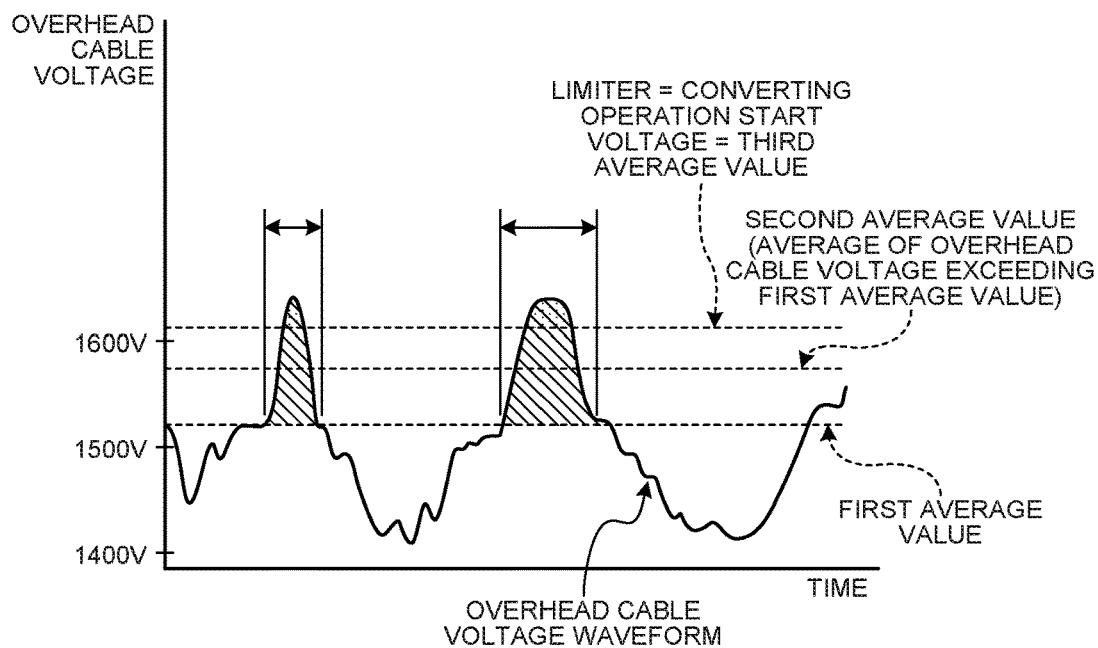
FIG. 5 is a diagram illustrating an example of the relation between the overhead cable voltage, the first average value, the second average value, and the third average value.

FIG. 5 is a diagram illustrating an example of the relation between the overhead cable voltage, the first average value, the second average value, and the third average value in a case where the power is highly interchangeable among the electric vehicles (the power consumed by the electric vehicles is larger than the regenerative electric power generated by using the regenerative brake) and the overhead cable voltage is reduced. As illustrated in FIG. 5, in a case where the number of electric vehicles that consume the regenerative electric power generated by the electric vehicle using the regenerative brake is increased, the overhead cable voltage (average value) is reduced. In this case, the station auxiliary power source apparatus 1 uses the third average value as the converting-operation start voltage, and it performs a power converting operation when the overhead cable voltage is larger than this voltage, thus supplying the power to be supplied to the load 302. As can be clearly seen from the comparison between FIGS. 4 and 5, in a case where the power is highly interchangeable among the electric vehicles (the case of FIG. 5), the difference between the average overhead cable voltage (=the first average value) and the converting-operation start voltage in the this time zone becomes large. Therefore, even in a case where the overhead cable voltage similarly changes in the cases of FIGS. 4 and 5, the station auxiliary power source apparatus 1 operates the conversions less frequently in the case of FIG. 5 so that the regenerative electric power can be more interchangeable among the electric vehicles.

In this way, the station auxiliary power source apparatus according to the present embodiment calculates the average value (the first average value) of the overhead cable voltage once in every given short period (for example, for one hour). Then it sets a threshold value for starting the conversion of the overhead cable voltage into the voltage to be supplied to the load in the station on the basis of the first average value and the average value of the overhead cable voltage (the average value per day). Specifically, the average value (the second average value) of the overhead cable voltage exceeding the first average value in the short time period is calculated, and the average value whichever is the larger of the second average value and the average value of the overhead cable voltage is determined and then used as the threshold value. Therefore, because the threshold value can be set according to the interchangeable state of the regenerative electric power among the electric vehicles, the station auxiliary power source apparatus can accurately determine the state where the regenerative electric power is not interchangeable among the electric vehicles, and it can accurately time the consumption of the regenerative electric power. As a result, it is possible to efficiently use the regenerative electric power and thus prevent the occurrence of cross currents. In addition, since the average value is calculated separately on the basis of one of the weekday schedule and the holiday schedule, and the threshold value is set on the basis of each average value respectively, it is possible to more accurately determine the state where the regenerative electric power is not fully interchangeable among the electric vehicles.

INDUSTRIAL APPLICABILITY

As described above, the present invention is advantageously used for a station auxiliary power source apparatus that converts the regenerative electric power generated by the electric vehicles into the power to be used by the load in the station.

REFERENCE SIGNS LIST

1 STATION AUXILIARY POWER SOURCE APPARATUS
11 CONTROL DEVICE
12 INVERTER
13 VOLTAGE SENSOR
20 INTERFACE UNIT
30 OPERATION-START VOLTAGE DETERMINATION UNIT
31 FIRST AVERAGE CALCULATION UNIT
32 SECOND AVERAGE CALCULATION UNIT
33 THIRD AVERAGE CALCULATION UNIT
34 COMPARATOR
40 STORAGE UNIT
50 VOLTAGE COMMAND CALCULATION UNIT
60 PWM SIGNAL GENERATION UNIT
100 ELECTRIC POWER SUBSTATION
200 OVERHEAD CABLE
201 ELECTRIC VEHICLE
301 TRANSFORMER
302 LOAD

The invention claimed is:

1. A station auxiliary power source apparatus that converts power supplied from an overhead cable to power to be supplied to a load in a station, the station auxiliary power source apparatus comprising:
a control device including:
a first calculator to calculate a plurality of first average values of an overhead cable voltage, wherein each of the plurality of first average values of the overhead cable voltage is calculated over a first predetermined period of time,
a second calculator to calculate, over a second predetermined period of time, a second average value being an average value of values, from the calculated plurality of first average values of the overhead cable voltage, that are larger than an average value of the calculated plurality of first average values, and
a third calculator to to calculate a third average value being an average value of the overhead cable voltage per day; and
a comparator to select any one of the second average value and the third average value, and set the selected value as a threshold value,
wherein the station auxiliary power source apparatus converts the power supplied from the overhead cable to the power to be supplied to the load when the overhead cable voltage is higher than the selected threshold value.

2. The station auxiliary power source apparatus according to claim 1, wherein
the first, the second, and the third average values are respectively calculated by the control device for each day to which the same type of daily schedule is implemented, and
the comparator selects the second average value or the third average value corresponding to a daily schedule implemented when the selection is performed.

3. The station auxiliary power source apparatus according to claim 1, wherein
the comparator selects whichever is a larger value from the second average value and the third average value as the selected threshold value.

4. The station auxiliary power source apparatus according to claim 1, wherein
an output voltage from an electric power substation to the overhead cable is used for the third average value.

5. The station auxiliary power source apparatus according to claim 4, wherein
the control device calculates the respective average values for each day to which the same type of daily schedule is implemented, and
the comparator selects:
the second average value corresponding to the schedule implemented when the selection is performed, or the output voltage from the electric power substation to the overhead cable.

6. The station auxiliary power source apparatus according to claim 4, wherein
the comparator selects whichever is a larger value from the second average value and the output voltage from the electric power substation to the overhead cable as the selected threshold value.

7. The station auxiliary power source apparatus according to claim 1, further comprising an inverter that receives a control signal based on the selected threshold value, and converts the power supplied from the overhead cable to the power to be supplied to the load based on the received control signal.

8. The station auxiliary power source apparatus according to claim 7, wherein responsive to receiving the control signal, the inverter starts the conversion of the power supplied from the overhead cable to the power to be supplied to the load responsive to the overhead cable voltage being greater than the selected threshold value.

9. The station auxiliary power source apparatus according to claim 1, wherein the station auxiliary power source apparatus starts the conversion of the power supplied from the overhead cable to the power to be supplied to the load responsive to the overhead cable voltage being greater than the selected threshold value.

* * * * *